(12) United States Patent
Smets et al.

(10) Patent No.: US 7,669,772 B2
(45) Date of Patent: Mar. 2, 2010

(54) METHOD AND SYSTEM USING A BITMAP FOR PASSING CONTACTLESS PAYMENT CARD TRANSACTION VARIABLES IN STANDARDIZED DATA FORMATS

(75) Inventors: Patrick Smets, Nijlen (BE); Eddy Lodewijk Hortensia Van De Velde, Leuven (BE)

(73) Assignee: Mastercard International Incorporated, Purchase, NY (US)

( * ) Notice: Subject to any disclaimer, the term of this patent is extended or adjusted under 35 U.S.C. 154(b) by 37 days.

(21) Appl. No.: 11/182,351

(22) Filed: Jul. 15, 2005

(65) Prior Publication Data

US 2006/0022033 A1 Feb. 2, 2006

Related U.S. Application Data

(60) Provisional application No. 60/588,624, filed on Jul. 15, 2004.

(51) Int. Cl.
*G06K 19/06* (2006.01)
(52) U.S. Cl. ...................................... 235/492; 235/493
(58) Field of Classification Search ................ 235/380, 235/492, 493; 711/102, 104, 115
See application file for complete search history.

(56) References Cited

U.S. PATENT DOCUMENTS

| | | | |
|---|---|---|---|
| 4,066,873 A | 1/1978 | Schatz | 235/487 |
| 4,614,861 A * | 9/1986 | Pavlov et al. | 235/380 |
| 4,697,073 A | 9/1987 | Hara | 235/487 |
| 4,755,940 A * | 7/1988 | Brachtl et al. | 705/44 |
| 5,225,977 A | 7/1993 | Hooper et al. | 364/401 |
| 5,466,919 A | 11/1995 | Hovakimian | 235/380 |
| 5,511,114 A | 4/1996 | Stimson et al. | 379/114 |
| 5,623,552 A | 4/1997 | Lane | 382/124 |
| 5,740,349 A * | 4/1998 | Hasbun et al. | 714/8 |
| 5,748,737 A | 5/1998 | Daggar | 380/24 |
| 5,880,452 A | 3/1999 | Plesko | 235/472 |
| 6,021,948 A * | 2/2000 | Tsai et al. | 235/486 |
| 6,028,920 A | 2/2000 | Carson | 379/114 |

(Continued)

FOREIGN PATENT DOCUMENTS

JP 2001-076117 3/2001

(Continued)

OTHER PUBLICATIONS

Contactless Material (WG8); SmartCard Secure Operating System at www.jayacard.org; 3 pages; www.14443.org—Contactless Documentation.

*Primary Examiner*—Kumiko C Koyama
(74) *Attorney, Agent, or Firm*—Baker Botts LLP

(57) ABSTRACT

An electronic payment system is configured to process both proximity payment card type and magnetic stripe card type transactions. The magnetic stripe card transaction data is communicated between cards, readers, and transactions authorizing or approving parties in common industry ISO 7811 standard data structures or tracks. The proximity payment card transaction data such a dynamic authentication codes are placed in unused space in the same standard formatted data structures. The availability of unused space varies with card issuer or vendor. An issuer-specific bitmap provides an index to the available space in discretionary data fields in magnetic stripe tracks. The bitmap also is stored in the card's discretionary data field.

16 Claims, 3 Drawing Sheets

Relation between Discretionary Data and Bit Map

U.S. PATENT DOCUMENTS

| | | | |
|---|---|---|---|
| 6,112,981 A | 9/2000 | McCall | 235/380 |
| 6,315,195 B1 | 11/2001 | Ramachandran | 235/380 |
| 6,318,633 B1 | 11/2001 | Drexler | 235/454 |
| 6,480,935 B1* | 11/2002 | Carper et al. | 711/115 |
| 7,023,849 B2* | 4/2006 | Moriwaki et al. | 370/390 |
| 2001/0001856 A1 | 5/2001 | Gould et al. | 705/39 |
| 2002/0046116 A1 | 4/2002 | Hohle et al. | 705/14 |
| 2002/0131567 A1* | 9/2002 | Maginas | 379/91.01 |
| 2003/0034388 A1* | 2/2003 | Routhenstein et al. | 235/380 |
| 2004/0188519 A1* | 9/2004 | Cassone | 235/382 |

FOREIGN PATENT DOCUMENTS

| | | |
|---|---|---|
| WO | WO 92/16913 | 1/1992 |

\* cited by examiner

F I G. 1. Numbering of Discretionary Data

| Discretionary Data | | | | | | | | | |
|---|---|---|---|---|---|---|---|---|---|
| $p_m$ | $p_{m-1}$ | $p_{m-2}$ | $p_{m-3}$ | ... | $p_5$ | $p_4$ | $p_3$ | $p_2$ | $p_1$ |

F I G. 2. Relation between Discretionary Data and Bit Map

| | | | | Discretionary Data | | | | | | | | | |
|---|---|---|---|---|---|---|---|---|---|---|---|---|---|
| | | | | $p_m$ | $p_{m-1}$ | $p_{m-2}$ | $p_{m-3}$ | ... | $p_5$ | $p_4$ | $p_3$ | $p_2$ | $p_1$ |
| $b_q$ | $b_{q-1}$ | $b_{q-2}$ | ... | $b_{m+1}$ | $b_m$ | $b_{m-1}$ | $b_{m-2}$ | $b_{m-3}$ | ... | $b_5$ | $b_4$ | $b_3$ | $b_2$ | $b_1$ |
| Bit Map | | | | | | | | | | | | | |

F I G. 3. Example $PUNATC_{TRACK2}$ = '031A'

| Discretionary Data | | | | | | | | | | | | |
|---|---|---|---|---|---|---|---|---|---|---|---|---|
| $p_{13}$ | $p_{12}$ | $p_{11}$ | $p_{10}$ | $p_9$ | $p_8$ | $p_7$ | $p_6$ | $p_5$ | $p_4$ | $p_3$ | $p_2$ | $p_1$ |
| 0 | 0 | 0 | 0 | 0 | 0 | 1 | 1 | 0 | 0 | 0 | 1 | 1 | 0 | 1 | 0 |
| $b_{16}$ | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ |
| '0' | | | | '3' | | | | '1' | | | | 'A' | | | |
| Bit Map = '031A' | | | | | | | | | | | | | | | |

F I G. 4

| DD | | | | | | | | | | | | |
|---|---|---|---|---|---|---|---|---|---|---|---|---|
| $p_{13}$ | $p_{12}$ | $p_{11}$ | $p_{10}$ | $p_9$ | $p_8$ | $p_7$ | $p_6$ | $p_5$ | $p_4$ | $p_3$ | $p_2$ | $p_1$ |
| 0 | 0 | 0 | 0 | 0 | 0 | 0 | 0 | 1 | 1 | 1 | 0 | 0 | 0 | 0 | 0 |
| $b_{16}$ | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ |
| 0 | | | | 0 | | | | E | | | | 0 | | | |
| PCVC = 0x00E0 | | | | | | | | | | | | | | | |

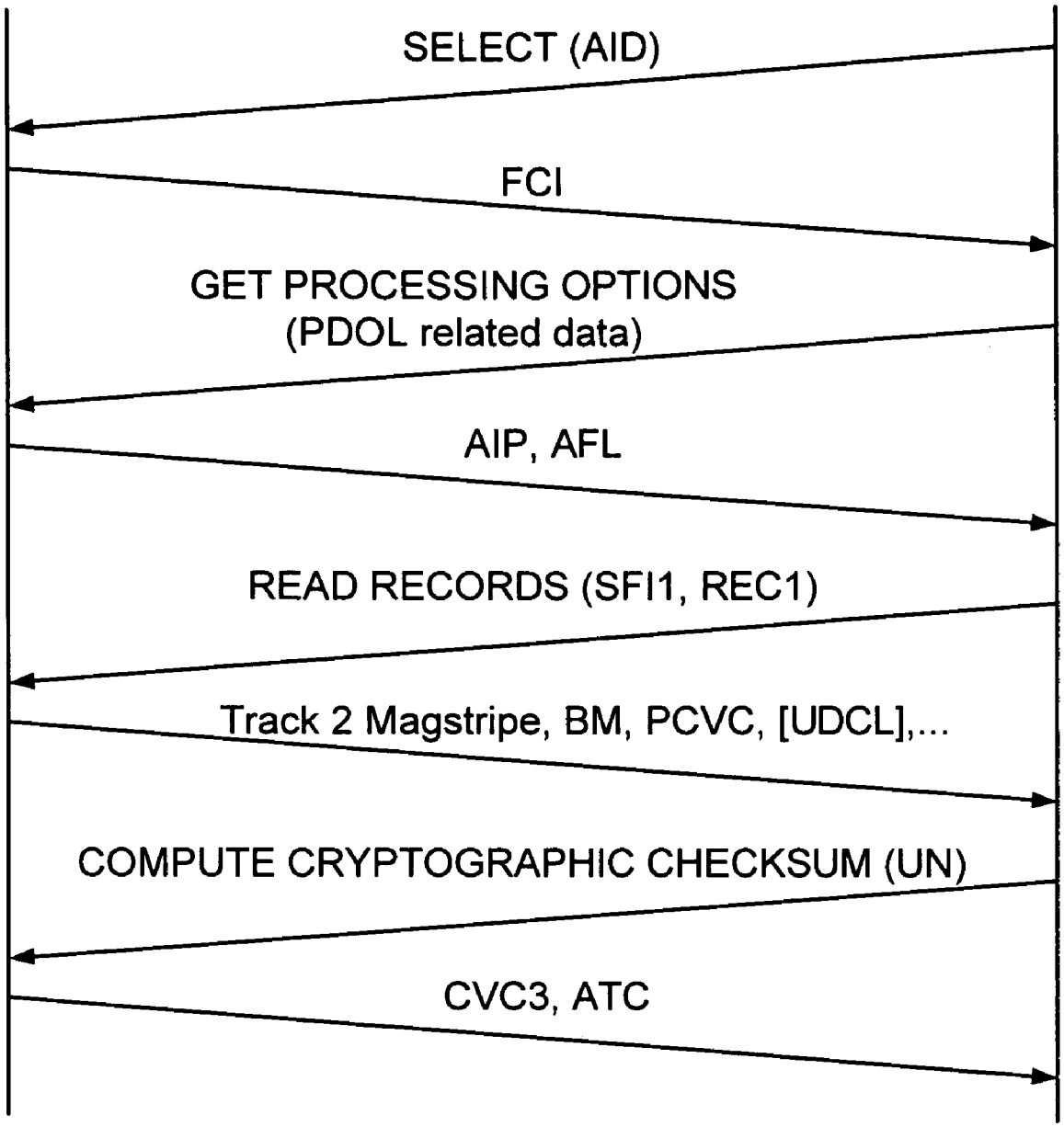
FIG. 6. Transaction Flow

METHOD AND SYSTEM USING A BITMAP FOR PASSING CONTACTLESS PAYMENT CARD TRANSACTION VARIABLES IN STANDARDIZED DATA FORMATS

CROSS-REFERENCE TO RELATED APPLICATIONS

This application claims the benefit of U.S. provisional patent application No. 60/588,624 filed on Jul. 15, 2004, which is hereby incorporated by reference in its entirety herein.

BACKGROUND OF THE INVENTION

The use of plastic cards for payment transactions is ubiquitous in the modern economy. All involved parties e.g., the payment card industry, consumers, banks and merchants have an interest in making these card-based payment transactions secure and fraud-proof.

Early plastic cards were embossed with general data such as the card number and the cardholder's name. Signature fields and security printing were a feature of these cards created to provide protection against tampering and forgery. These security features, which relied solely on the retail staff for visual verification, did not eliminate fraud.

Now, plastic cards have a magnetic stripe added to the back of the cards in which card holder information and other security and encryption codes are stored in machine-readable form. The machine-readable nature of the data makes it more resistant to tampering or forgery. The physical structure and data content of the magnetic stripes are standardized to achieve desirable interoperability (e.g., most ATM cards work at every money machine in the world). Towards this end, industry standards organizations and groups (e.g., International Organization for Standards (ISO) and International Electro Technical Committee (IEC)) have formulated voluntary minimum standards for payment cards. An exemplary standard. which is applicable to magnetic stripes on payment cards, is the ISO/IEC 7811 standard ("ISO 7811"). This standard sets the minimum requirements for the data structures and encoding in payment cards' magnetic stripes.

According to ISO 7811, magnetic stripe data must be laid out in three tracks. A magnetic stripe card may have any one of these three tracks, or a combination of these tracks. Under the standard, Track 1, which was developed by the International Air Transportation Association (IATA), is 210 bpi with room for 79 7-bit characters. Track 1 is encoded with a 7-bit scheme (6 data bits plus one parity bit) based on ASCII. The seventh bit is an odd parity bit at the end of each byte. Track 2, which was developed by the American Bankers Association (ABA) for on-line financial transactions, is 75 bpi with room for 40 5-bit numeric characters. Track 3, which is also used for financial transactions, is 210 bpi with room for 107 numeric digits.

ISO 7811 further delimits data fields in the Tracks and reserves them for specific information. Track 1, for example, includes designated data fields for specific information such as Primary Account Number, Country Code, Surname, First Name or Initial, Middle Name or Initial, Title, and Expiration Date, etc. The data is encoded in ASCII.

Table 2 shows the standardized data field format recommended for Track 2.

| | |
|---|---|
| Start Sentinel | 1 byte (0x0B, or a; in ASCII) |
| Primary Account Number | Up to 19 bytes |
| Separator | 1 byte (0x0D, or an = in ASCII) |
| Country Code | 3 bytes, if used. (The United States is 840) This is only used if the account number begins with "59" |
| Expiration Date or Separator | 4 bytes (YYMM) or the one byte separator if a non-expiring card |
| Discretionary Data | Optional data can be encoded here by the issuer |
| End Sentinel | 1 byte (0x0F, or a? in ASCII) |
| Longitudinal Redundancy Check (LRC) | 1 byte |

Each of the three Tracks includes a data field, which is reserved for individual use by the card issuer or vendor. Card issuers or vendors often utilize the reserved data field, which is labeled "discretionary data", to store a static authentication value or other vendor-specific identification information. For example, assignee MasterCard International Incorporated ("MasterCard") prefers to store a numeric card validation code value (CVC1) in the Track 2 discretionary data field. The CVC1 value, which is a three digit encrypted number, can be checked to ensure that the magnetic stripe information has not been altered in any way. Other card vendors or issuers may store other codes or values in the discretionary data field, or none at all.

For processing a transaction, the card reader/terminal reads the formatted data, which is recorded in the card's magnetic stripe Tracks. The formatted data may be transmitted to an issuer or bank for validation or approval of the transaction.

The payment card industry is now exploiting developments in semiconductor device technologies to build in more functionality and features in the plastic payment cards. For example, smart cards that contain an actual integrated circuit chip, and contactless cards that use a magnetic field or radio frequency identification (RFID) tags for close-proximity reading are now available. The built-in electronic processing features of the smart cards and/or proximity cards make it possible deploy more rigorous solutions for securing card use and preventing fraud. For example, some available smart cards are configured to perform "on card" cryptographic functions for security solutions based on digital signatures.

Electronic payment systems based on these newer types of cards are in use or under development. For example, assignee MasterCard has developed proprietary specifications MasterCard PayPass™ ISO/IEC 14443 Implementation Specification ("PayPass") for implementation of electronic payment systems based on proximity payment cards. A security solution, which may be utilized in PayPass, is based on generation of a dynamic authentication value or number (CVC3). The dynamic authentication value changes with each transaction. Thus, in the event an unauthorized person obtains the CVC3 number for a particular transaction, the unauthorized person cannot use that CVC3 number as the authentication value for the next or any other transactions. (See e.g., John Wankmueller, U.S. Pub. Appl. No. 20050127164 A1).

Any electronic payment system based on the new card technologies is likely to gain acceptance by users only if the new system is backwards compatible with legacy infrastructure (e.g., terminals, card readers, and back office operations), which was designed for processing magnetic stripe cards. Thus, it may be advantageous to provide payment cards that can function with both magnetic stripe card systems and proximity payment card systems. In such cards, it may be preferable to transmit the dynamic authentication value (CVC3) and other proximity card function specific data to the issuer or other validating party in a format which does not disturb the data fields or information required by ISO 7811 for magnetic stripe card transactions. It has been proposed that the CVC3 number and other proximity card function specific data should be placed in a discretionary data field of a magnetic stripe Track data format in the expectation that the standardized data fields required for magnetic stripe card operation will not be disturbed. Unfortunately, usage of the discretionary data fields by vendors and issuers is not consistent. For example, the static authentication values (e.g., CVC2) used by vendors may be either a 3 digit or a 4 digit number. Thus, the space available in the discretionary data fields for placing the CVC3 number may vary from card to card according to vendor encoding of the discretionary data fields. This varying availability of discretionary data space makes it difficult to standardize use of the space for storing proximity card function related data (e.g., CVC3).

Consideration is now being given to ways of making proximity payment card implementations compatible with existing standardized magnetic stripe payment card transaction processes. Attention is being directed to the development of proximity payment cards that can be used with existing magnetic stripe card infrastructure and processes. In particular, attention is being directed to the formatting of proximity function related data in a manner that does not disturb existing standardized data structures or information used in the magnetic stripe card transactions.

SUMMARY OF THE INVENTION

The present invention provides a standardization method and a system for communicating proximity card transaction data in a form which is compatible with installed electronic payment systems or infrastructure for processing magnetic stripe card transactions.

The standardization method and system place or integrate the proximity payment card transaction data (e.g., dynamic authentication codes) in ISO 7811 byte-level formatted data structures that are commonly used in processing magnetic stripe card transactions. The proximity payment card transaction data is placed in unused portions of discretionary data fields (e.g., Track 2 discretionary data field). The availability of unused space in a card's discretionary data fields can vary by card issuer or vendor. An issuer or vendor-specific bitmap identifies available unused space in the discretionary data fields in the cards. Dynamic authentication codes, unpredictable numbers, automatic transaction counter and/or other proximity card transaction parameters are placed in the discretionary data fields in available free space, which is identified by the bitmap.

The flexible manner of placing proximity card function data or digits in the card's discretionary data fields does not have any adverse effect on card functions. Card behavior is independent of vendor usage of the discretionary data fields.

Further features of the invention, its nature and various advantages will be more apparent from the accompanying drawings and Appendix and the following detailed description.

BRIEF DESCRIPTION OF THE DRAWINGS

FIG. 1 is a diagram illustrating a numbering or indexing scheme for different digit positions in a discretionary data field.

FIG. 2 is a diagram illustrating the relationship between a bit map and discretionary data field digit positions.

FIG. 3 is a diagram illustrating an exemplary two-byte bit map (BM=0x031A), which identifies five useable digit positions p10, p9, p5, p4 and p2 in Track 2 discretionary data field (13 digits) in accordance with the principles of the present invention.

FIG. 4 is a diagram illustrating an exemplary PCVG bit map 0x00E0 which identifies three useable digit positions p8, p7 and p5 in Track 2 discretionary data field (13 digits) where CVC3 digits can be placed in accordance with the principles of the present invention.

FIG. 6 is a diagram illustrating the interactions and communications between a proximity payment card and a terminal during the conduct of an electronic transaction in accordance with the principles of the present invention.

DETAILED DESCRIPTION OF THE INVENTION

Figure 5:
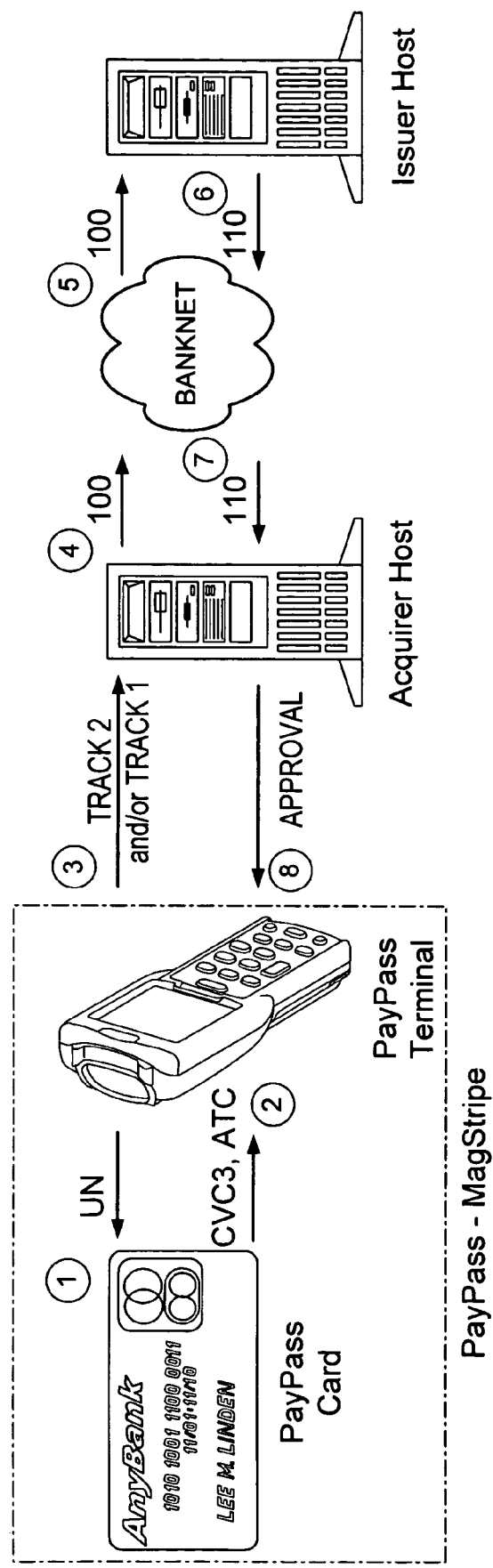
FIG. 5 is a schematic illustration of an electronic payment system capable of processing both proximity payment card transactions and magnetic stripe card transactions in accordance with the principles of the present invention.

The invention provides a standardization method and system for placing proximity card function data or digits in discretionary data fields used for magnetic stripe cards. The digits are stored in available space in the discretionary data fields, which has not been used by card issuers or vendors. The number of such digits and their precise locations within a discretionary data field are flexibly assigned using a bitmap. The bitmap is stored in the card's discretionary data field. The flexible manner of placing proximity card function data or digits in the card's discretionary data fields does not have any adverse effect on card functions. Card behavior is independent of vendor usage of the discretionary data fields.

For purposes of illustration the inventive data placement method is described herein with reference to the discretionary data field defined in Track 2. However, it will be understood that the inventive data placement method is readily extended to additional or alternate discretionary data fields (e.g., Track 1 discretionary data field). Further, the inventive storage method is described herein using as an example the placement of a card validation code (CVC3) number, which is generated as a security measure during transaction processing. However, it will be understood that other data may be similarly placed and communicated.

The standardization method and format may be incorporated in suitable electronic payment system applications so that the system can process both proximity payment card transactions and magnetic stripe card transactions. Recently, assignee MasterCard International Incorporated ("MasterCard") has developed proprietary specifications MasterCard PayPass™ ISO/IEC 14443 Implementation Specification ("PayPass") for implementation of proximity payment card technologies. The PayPass implementation is consistent with the ISO 14443 Standard and the ISO 7811 Standard and provides a convenient example illustrating the principles of the present invention. The PayPass implementation provides a "PayPass—Mag Stripe" application, which can process transactions based on proximity cards and magnetic stripe cards. (See FIG. 5). The PayPass—Mag Stripe application is an extension of the currently available magnetic-stripe applications for debit and credit payments. PayPass—Mag Stripe uses the same processing infrastructure as that is now used for magnetic stripe card transactions. It will be understood that the selection of the PayPass implementation for purposes of illustration is only exemplary, and that the principles of the present invention can be more generally applied to electronic payment devices and systems that operate under other common industry or proprietary standards.

With reference to FIG. 5, in a proximity payment card transaction between an interacting payment card (e.g., PayPass card 1) and a reader terminal 2, as part of the security procedure, terminal 2 generates and transmits to the payment card an unpredictable number (UN). In response, payment card 1 computes a CVC3 number based on a portion of the UN and transmits the computed CVC3 number to terminal. Payment card 1 may use a secret encryption key stored on the card for computing the CVC3 number. Alternatively, payment card 1 may be personalized at the card issuer option to compute the CVC3 number based on a portion of the UN and on the card's application transaction counter (ATC). In such cases, payment card 1 transmits both the computed CVC3 number and the ATC to the terminal 2. A bitmap (BM) and a Position CVC3 data element (PCVC) stored on the card provide terminal 2 with rules for placing proximity payment card transaction data in discretionary data space. For the subject proximity payment card transaction, terminal 2 packages or formats the ATC, UN, and the CVC3 number in a discretionary data field according to these rules. Terminal may then communicate the discretionary data field under magnetic stripe card conventions to an acquirer host 4 and/or issuer host 5 for authorization of the transaction. Terminal 2 may, for example, send the discretionary data field as part of Track 2 in Data Element 35 (DE35) of a standardized message 100 to the issuer for authorization or approval (8, 110).

FIG. 1 shows a numbering or indexing of different positions in a discretionary data field (e.g. Track 2 discretionary data field). The number of digits present in discretionary data is indicated by the index m. Card vendors and issuers use part of discretionary data field for legacy payment systems. As a result, only a small part of discretionary data field is available as vehicle for transporting PayPass data. Therefore, flexibility in using different combinations of UN and ATC as well as positioning these data elements in the discretionary data field is required.

For example, in the most general case, the CVC3 number is generated by the PayPass card by employing a diversified secret key and the following input data: the static part of the Track data; the ATC of the card, and the UN provided by the terminal. Not all of the input data types are or need to be used in every instance. Depending on the back-office system and the number of digits, which the card issuer makes available in the discretionary data fields of the Tracks, different combinations of input data may be used to generate the CVC3 number.

FIG. 2 shows the relationship between a bitmap and the discretionary data field's digit positions. Each bit in the bitmap refers to a position in the discretionary data field. The least significant bit of the bitmap (i.e., the rightmost bit $b_1$) refers to position $p_1$. The number of bits q in the bitmap is always a multiple of 8. The number q is related to the number of discretionary data field digits m by the equation:

$$q=((m/8))+1$$

Thus, for Track 2 discretionary data field ("Track 2 Data"), m is a maximum of 13 digits, resulting in a bitmap of 16 bits or 2 bytes. For Track 1 discretionary data field ("Track 1 Data"), the maximum value of m is 48, resulting in a bitmap of length 6 bytes or 48 bits.

FIG. 3 shows an exemplary two-byte bitmap (BM=0x031A), which identifies digits p10, p9, p5, p4 and p2 in Track 2 Data (13 digits). Specific bitmaps used in PayPass applications may indicate specific positions in Track 2 Data for placing UN and ATC. Another bitmap, Position CVC3 (PCVC) may be used to indicate specific positions in Track 2 Data for placing the CVC3 number.

The bitmaps are card parameters that can be personalized as desired by the card issuers or vendors. By designing the bitmaps (e.g., at a card personalization stage), a card issuer retains full flexibility on the number, position and usage of PayPass data (digits). By using the bitmaps, the terminal places UN and ATC digits at locations in discretionary data, which are specified by the issuer at the card personalization stage. Further, the terminal also places the CVC3 digits according to the vendor-specified bitmap.

The terminal is assigned the chore of conversion from binary to binary coded decimal (BCD). This assignment reduces card complexity and improves transaction performance. As the terminal processes or applications do the entire filling or placing of the discretionary data fields, on-card processes do not have to be concerned with or aware of the bitmaps. In exemplary implementations, on-card processes are always the same, independent of the values of the bitmaps. For example, in the case where on-card CVC3 computation is based on the ATC, the on-card computation always uses the full ATC (i.e., the full two bytes). The terminal converts the ATC from binary coding to BCD coding and populates the discretionary data with the least significant part of the ATC digits as indicated by the bitmap. Card behavior is independent of the number of ATC digits placed and the locations of such digits in the discretionary data fields.

In another example of the independence of on-card processes, the card includes the full UN as received from the terminal in the CVC3 computation. The terminal processes provide a UN with leading zeroes as indicated by the bitmaps, so that only the relevant parts of UN are placed in the discretionary data field. For example, if a particular card issuer specified bitmap indicates that only three (3) UN digits are to be placed in the discretionary data field, then the terminal must send a UN with five (5) leading zeroes as the UN length is always eight (8) digits (e.g., if the value of the UN is 123, then the terminal will send 00000123 to the card). The card will include the full eight-digit UN 00000123 in the computation of the CVC3, while the terminal will place only the three digits 123 in the discretionary data field. If for another card, the issuer-specified bitmap indicates that six (6) UN digits are to be included in the discretionary data field, then the terminal must send a UN with two (2) leading zeroes (e.g., if the value of the UN is 456789, then the terminal will send 00456789 to the card). The card will include the full eight-digit 00456789 in the calculation of the CVC3, while the terminal will place only the six digits 456789 in the discretionary data field. These examples show that the card behavior is independent of the number of UN digits included in the discretionary data field, as well as of their position in the discretionary data field.

As yet another example of the independence of card behavior, a CVC3 number returned by a card is always two (2) bytes long and in binary format. The terminal converts the CVC3 to BCD value and decides on the number of CVC3 digits to place in the discretionary data field, based on a PCVG bitmap.

FIG. 4 shows an exemplary PCVG bitmap 0x00E0, which like the bitmaps for UN or ATC placement, ensures that on-card processes and transaction functions are independent of the number and location of CVC3 digits placed in the discretionary data field.

FIG. 6 shows the interactions and communications that may occur between a PayPass card and a terminal during the conduct of transaction 100 (FIG. 5) using the exemplary PayPass—Mag Stripe application.

At a first step 101 in transaction 100, the terminal selects the PayPass—Mag Stripe application. At step 102, the card responds with a file control information request. The requested information may include a list of tags and lengths of terminal-resident data elements (PDOL) needed by the card for further transaction processing. At step 103, the terminal issues a command (GET PROCESSING OPTIONS), which may include the requested PDOL information. At step 104, the card returns indicators (AIP and AFL) which indicate that all data to be read by the terminal are included in record 1 of the file with SF1 1. Next at steps 105 and 106, the terminal issues a command (READ RECORD) to retrieve the static data from the card, and the card returns the appropriate Track 1 and Track 2 data and bitmaps. At step 107, the terminal issues a command (COMPUTE CRYPTOGRAPHIC CHECKSUM) using a data field which is the concatenated list of data elements resulting from processing an unpredictable number data object list (UDOL) returned by the card at step 106. This command initiates the computation of a dynamic CVC3 Track 2 number in the PayPass card. Additionally or alternatively, a dynamic CVC3 Track 1 number may be computed. The computation uses a secret key stored in the card and is based on the UN sent by the terminal and/or the ATC of the card. At step 109, the card sends the ATC and the computed CVC3 Track 2 and/or Track 1 numbers to the terminal.

To place the proximity payment transaction related data in Track 2 data format, the terminal uses the inventive bitmap guided procedure using bitmaps provided by the card. (See FIGS. 2-4). The terminal converts the binary CVC3 Track 2 number into BCD encoded digits and copies the relevant digits in the discretionary data field of the Track 2 Data at the places indicated by a bitmap ("Track 2 BitMap for CVC3 ($PCVC3_{Track2}$)") provided by the card. The terminal also copies the relevant digits of UN into the discretionary data field of the Track 2 Data. The number of UN digits ($n_{UN}$) is copied in the least significant digit of the discretionary data field. A bitmap ("Track 2 BitMap for UN") indicates where the terminal must copy the UN digits in the discretionary data field of the Track 2 Data. In cases where the number of ATC digits to be included in the discretionary data field is non-zero (indicated by $NATC_{Track}$), then the terminal converts the ATC into BCD encoded digits and copies relevant ATC digits into the discretionary data field of the Track 2 Data at the places indicated by a bitmap ("Track 2 Bitmap for ATC ($PUNATC_{Track\,2}$)").

The terminal may use a similar bitmap guided procedure to place data in Track 1 discretionary data fields, in cases where the card returns Track 1 data (step 106) in response to the READ RECORD command (step 105). For the Track 1 Data, the terminal first converts the data returned by the card into ASCII encoded characters before copying them into the discretionary data.

The use of bitmaps allows a flexible and efficient use of available digits in discretionary data fields without having a negative impact on card complexity.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

We claim:

1. A method for integrating proximity payment card transaction parameters for a payment-by-proximity-card transaction in industry standard -ISO 7811-formatted magnetic card data structures, wherein said magnetic card data structures comprise industry-standard Track 1, Track 2 and Track 3 magnetic card data structures, such that said proximity payment transaction parameters are in a format compatible with an electronic payment system infrastructure for processing magnetic stripe card payment transactions, the method comprising the steps of:

(a) providing in a data field on a proximity payment card a static bitmap which identifies unused positions in a discretionary data field of said magnetic card formatted data structure associated with said proximity payment card; and (b) contactlessly transmitting said bitmap to a proximity payment terminal for placing said proximity payment card transaction parameters in the discretionary data field of said industry standard magnetic card formatted data structure at positions identified by the bitmap, the resulting electronic proximity payment transaction processing message generated by said proximity payment terminal using said bitmap is in a standard magnetic stripe format compatible with electronic payment system infrastructure for processing magnetic stripe card payment transactions and so that the payment-by-proximity-card transaction is processed by said electronic payment system infrastructure as if the payment-by-proximity-card transaction is a standard magnetic stripe card payment transaction.

2. The method of claim 1 wherein the proximity payment card transaction parameters comprise a dynamic authentication code (CVC3), and wherein the step (a) of providing a bitmap comprises providing a two-byte bitmap which identifies unused positions in a 13 digit discretionary data field in Track 2.

3. The method of claim 1 wherein the proximity payment card transaction parameters comprise at least two of a dynamic authentication code (CVC3), an automatic transaction counter (ATC) and an unpredictable number (UN), and wherein the step (a) of providing a bitmap comprises providing a plurality of corresponding bitmaps which identify unused positions in the discretionary data field in the Track for placing the proximity payment card transaction parameters present.

4. The method of claim 1 wherein the proximity payment card transaction parameters relate to a transaction between a proximity payment card and a terminal, wherein step (b) further comprises using terminal processes to place the proximity payment card transaction parameters in the discretionary data field in the Track at positions identified by the bitmap.

5. The method of claim 4 wherein the terminal sends an unpredictable number (UN) to the proximity payment card, and wherein the proximity payment card computes a dynamic authentication code (CVC3) value based on a portion of the received unpredictable number (UN) and communicates the computed dynamic authentication code (CVC3) value to the terminal for placement in the discretionary data field in the Track.

6. The method of claim 5 wherein the proximity payment card computes the dynamic authentication code (CVC3) value based on a portion of the-unpredictable number (UN) and an automatic transaction counter (ATC) and communicates the computed dynamic authentication code (CVC3) value and the automatic transaction counter (ATC) to the terminal for placement in the discretionary data field in the Track.

7. The method of claim 5 wherein the proximity payment card communicates the computed dynamic authentication code (CVC3) value to the terminal in binary format and the terminal converts the received dynamic authentication code (CVC3) value in binary coded decimal (BCD) format before placement in the discretionary data field in the Track.

8. The method of claim 1 wherein said proximity payment card receives contactlessly from said proximity payment card terminal an unpredictable number having a number of non-zero digits, wherein said number of non-zero digits are determined based on a portion of said static bitmap and wherein payment card transaction parameters are based at least in part on said unpredictable number.

9. A proximity payment terminal for integrating proximity payment card transaction parameters related to a payment-by-proximity-card transaction, involving a proximity payment card and a terminal, in industry standard -ISO 7811- magnetic card formatted data structures, wherein said magnetic card data structures comprise Track 1, Track 2 and Track 3 data structures in electronic payment transaction processing messages, such that said proximity payment transaction parameters are in a format compatible with an electronic payment system infrastructure for processing magnetic stripe card payment transactions, the terminal comprising:

(a) a receiver for receiving from a proximity payment device a static bitmap which identifies unused positions in a discretionary data field of said industry standard formatted data structure associated with said proximity payment device, which discretionary data field under the ISO 7811 standard is reserved exclusively for card-issuer discretionary data use and is not designated for use by merchant, acquirer, or other transaction party data; and (b) an application configured to place the proximity payment card transaction parameters in the discretionary data field of said industry standard formatted magnetic card data structure at positions identified by the bitmap so that the resulting in electronic payment transaction processing message is in a format compatible with electronic payment system infrastructure for processing magnetic stripe card payment transactions and so that the payment-by-proximity-card transaction is processed by said electronic payment system infrastructure as if the payment-by-proximity-card transaction is a standard magnetic stripe card payment transaction.

10. The system of claim 9 wherein the transaction parameters comprise a dynamic authentication code (CVC3), and wherein the bitmap comprises a two-byte bitmap which identifies unused positions in a 13 digit discretionary data field in Track 2.

11. The system of claim 9 wherein the transaction parameters comprise at least two of a dynamic authentication code (CVC3), an automatic transaction counter (ATC) and an unpredictable number (UN), and wherein the bitmap comprises a plurality of corresponding bitmaps which identify unused positions in the discretionary data field in the Track for placing the transaction parameters present.

12. The system of claim 9 wherein the application comprises a terminal application which places the transaction parameters in the discretionary data field in the Track at positions identified by the bitmap.

13. The system of claim 12 wherein the terminal sends an unpredictable number (UN) to the proximity payment card and the proximity payment card computes a dynamic authentication code (CVC3) based on a portion of the unpredictable number (UN) and communicates the computed dynamic authentication code (CVC3) to the terminal, and wherein the terminal application is configured to place the received dynamic authentication code (CVC3) in the discretionary data field in the Track.

14. The system of claim 13 wherein the proximity payment card computes a dynamic authentication code (CVC3) based on a portion of the unpredictable number (UN) and an automatic transaction counter (ATC) and communicates the computed dynamic authentication code (CVC3) and the automatic transaction counter (ATC) to the terminal, and wherein the terminal application is configured to place the received dynamic authentication code (CVC3) and ATC in the discretionary data field in the Track for placement in the discretionary data field in the Track.

15. The system of claim 13 wherein the proximity payment card communicates the computed dynamic authentication code (CVC3) value to the terminal in binary format, and wherein the terminal application is configured to convert the received dynamic authentication code (CVC3) in binary coded decimal (BCD) format and place the dynamic authentication code (CVC3) in binary coded decimal (BCD) format in the discretionary data field in the Track.

16. The system of claim 9 wherein the transaction parameters comprise an unpredictable number having a number of non-zero digits, wherein said number of non-zero digits are determined based on a portion of said static bitmap and wherein payment card transaction parameters are based at least in part on said unpredictable number.

* * * * *